(12) United States Patent
Suzuki

(10) Patent No.: US 6,624,361 B2
(45) Date of Patent: Sep. 23, 2003

(54) METHOD OF WATERPROOFING WIRE HARNESS

(75) Inventor: Hiroshi Suzuki, Susono (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/164,378

(22) Filed: Jun. 10, 2002

(65) Prior Publication Data

US 2002/0195267 A1 Dec. 26, 2002

(30) Foreign Application Priority Data

Jun. 11, 2001 (JP) ................................ P2001-175742

(51) Int. Cl.[7] .............................................. H01B 17/26
(52) U.S. Cl. ............................ 174/152 G; 174/153 G; 29/760; 29/748
(58) Field of Search ..................... 174/152 G, 153 G; 29/760, 748, 33 F

(56) References Cited

U.S. PATENT DOCUMENTS 6,158,113 A * 12/2000 Saito et al. ................... 29/760

FOREIGN PATENT DOCUMENTS

| JP | 08098374 A | * 4/1996 | ............ H02G/3/26 |
|----|------------|----------|----------------------|
| JP | 10-135657  | 5/1998   |                      |
| JP | 10-172361  | 6/1998   |                      |
| JP | 11-238416  | 8/1999   |                      |
| JP | 2000048649 A | * 2/2000 | ............ H01B/7/282 |
| JP | 2000-114746 | 4/2000  |                      |

* cited by examiner

Primary Examiner—Dean A. Reichard
Assistant Examiner—Jinhee Lee
(74) Attorney, Agent, or Firm—Sughrue Mion, PLLC

(57) ABSTRACT

In order to waterproof a plurality of wires which constitute a wire harness passed through a through hole formed in a grommet, a lower mold is provided with a first recessed portion, and an upper mold is provided with a second recessed portion. The first recessed portion and the second recessed portion define a cavity when the upper mold and the lower mold are integrated, such that a cross section of the cavity is substantially identical with a cross section of the through hole formed in the grommet. The wires are placed on the first recessed portion of the lower mold. Then, the wires are coated with a water stop agent. Further, the wires are applied with vibration so as to permeate the water stop agent into a gap between the wires. The upper mold and the lower mold are integrated such that a cross section of the wire harness is matched with a cross section of the cavity. The water stop agent permeated into the wires is solidified.

7 Claims, 7 Drawing Sheets

METHOD OF WATERPROOFING WIRE HARNESS

BACKGROUND OF THE INVENTION

This invention relates to a method of waterproofing a wire harness in which a grommet-passing portion of a wire bundle for passing through a grommet, adapted to be mounted in a through hole in a vehicle body panel of an automobile, is tied into a waterproof structure in which a gap between any two adjacent wires is closed by a water stop agent.

FIGS. 6A, 6B and 6C show a related method of producing a waterproof wire harness.

The wire harness 1 is used in the electric wiring for an automobile, and when a group of wires are shaped into an arrangement form, corresponding to an arrangement form on the vehicle, a waterproofing is applied to those portions of the wires which are to be passed through a grommet 3 adapted to be mounted in a through hole formed in a vehicle body panel.

More specifically, first, the grommet 3 is mounted on a predetermined portion of the wire bundle 4 as shown in FIG. 6A. Then a water stop agent in an unsolidified state is filled in a gap between an inner face of a harness-passing hole 3a in the grommet 3 and the wire bundle 4 as shown in FIG. 6B, and is allowed to stand for a predetermined period of time, so that the water stop agent is solidified, thereby providing a waterproof structure in which the gap between the wire bundle 4 and the grommet 3 is filled up by the solidified water stop agent 6, as shown in FIG. 6C.

In such a producing method, however, a very small gap remains between any two adjacent wires at the grommet-passing portion of the wire bundle 4, and therefore there is a fear that external rain water intrudes into these gaps because of a capillary phenomenon, which has invited a problem that a sufficient waterproof effect can not be obtained.

Therefore, there has been proposed a producing method shown in FIGS. 7 to 8F.

The waterproof wire harness-producing method is disclosed in JP-A-10-135657. A waterproofing jig 13 is beforehand mounted on a predetermined portion of an arrangement plate 11 which is used for preforming or shaping a group of wires into an arrangement form corresponding to an arrangement form on a vehicle.

A plurality of wire group support jigs 15a, 15b, 15c, 15d, 15e, . . . for supporting the wire group in a branched pattern, corresponding to the predetermined arrangement form, are mounted on the arrangement plate 11.

The waterproofing jig 13 has slits 13c for arranging the wires of the grommet-passing portion in a row, each of the slits being formed by a pair of opposed arms 13a and 13b.

The width of the slit 13c is so determined as to arrange the wires of the grommet-passing portion vertically one upon another in one row.

The waterproof structure of the grommet-passing portion, utilizing the waterproofing jig 13, is formed according to the procedure of FIGS. 8A to 8F.

First, grommet-passing portions of the group of wires 16 are arranged vertically in a row in a plane by the pair of spaced-apart slits 13, as shown in FIG. 8A. Then, a water stop agent 19 in an unsolidified state is applied to one face of that portion of the arranged wire group 16, disposed between the pair of slits 13c, by a water stop agent-coating nozzle 18 as shown in FIG. 8B. Generally, moisture-curing silicone RTV is used as the water stop agent 19. Then, a band of film 21 for uniting purposes is bonded to the one face of the wire group 16, coated with the water stop agent 19, thereby interconnecting the wires of the wire group 16 in such a manner that these wires are kept arranged in one row, and thereafter the waterproofing jig 13 is moved downward, thereby removing the wire group 16 from the waterproofing jig 13, as shown in FIG. 8C.

Then, the band of film 21 is wound on the wire group 16 to tie this wire group into a wire bundle of a round cross-section, as shown in FIG. 8D. Further, a tape 23 is wound on that portion of the wire bundle, tied by the band of film 21, thereby forming the wire bundle into such a circular cross-sectional shape that the wire bundle can be snugly fitted into a harness-passing hole in a grommet, as shown in FIG. 8E, and the water stop agent is solidified. Thereafter, the grommet 25 is mounted on that portion of the wire bundle having the tape 23 wound thereon, as shown in FIG. 8F.

In the above waterproof wire harness-producing method, however, in the case where the wire group includes wires of different outer diameters, it is difficult to arrange the wires in one row, and besides it is difficult to coat the water stop agent.

When the arrangement of the wires and the coating of the water stop agent are effected satisfactorily, a gap between any two adjacent wires at the grommet-passing portion of the wire bundle can be filled up by the water stop agent. Even in such a case, however, when the group of wires 16 is tied into a bundle by the band of film 21, the outer diameter of the resulting wire bundle is liable to vary, and in the next step of winding the tape 23, the outer diameter of the wire bundle must be corrected into a size, corresponding to the diameter of the harness-passing hole in the grommet 25, by adjusting the amount of winding of the tape 23. Thus, the operation for adjusting the amount of winding of the tape 23 is required, and therefore there is problems that much time and labor are required for the operation, and that it is difficult to carry out the operation in an automated manner.

And besides, when the tape 23 is wound spirally, there is a fear that very small gaps are formed in step portions, formed by the overlapping portions of the wound tape 23, thus lowering the waterproof performance.

SUMMARY OF THE INVENTION

It is therefore an object of the present invention to provide a method of waterproofing a wire harness in which grommet-passing portions of a group of wires can be tied together into a waterproof structure in which interstices between the wires are filled by a water stop agent, and besides the bundle of tied wires can be highly precisely finished into a desired outer diameter without the need for a time-consuming tape-winding operation regardless of whether or not the wire bundle includes the wires of different outer diameters, and the improved productivity and the enhanced waterproof performance can be achieved.

In order to achieve the above object, according to the present invention, there is provided a method of waterproofing a plurality of wires which constitute a wire harness passed through a through hole formed in a grommet, comprising the steps of:

providing a lower mold having a first recessed portion, and a upper mold having a second recessed portion, the first recessed portion and the second recessed portion defining a cavity when the upper mold and the lower mold are integrated, such that a cross section of the cavity is substantially identical with a cross section of the through hole formed in the grommet;

placing the wires on the first recessed portion of the lower mold;

coating the wires with water stop agent;

applying vibration to the wires so as to permeate the water stop agent into a gap between the wires;

integrating the upper mold and the lower mold such that a cross section of the wire harness is matched with a cross section of the cavity; and solidifying the water stop agent permeated into the wires.

Preferably, the cross section of the cavity is shaped into a circle. Preferably, a cross section of the first recessed portion of the lower mold is identical with a part of an inner peripheral face of the through hole formed in a grommet.

In the above construction, a grommet-passing portion of the wire harness permeated into a gap between the wires with the water stop agent, is pressed and formed into the cross sectional shape, corresponding to the cross sectional shape of the through hole of the grommet, so that the gaps between the wires are filled with the water stop agent. Further, by the press-shaping operation of integrating the upper mold and lower mold, the wire group is formed into the wire bundle of high precision which has such an outer diameter as to snugly fit in the harness-passing hole in the grommet.

Therefore, the grommet-passing portion of the wire group can be easily tied into the waterproof structure in which the gaps between the wires are filled up by the water stop agent, and besides the tied wire bundle can be highly precisely finished into the desired outer diameter without the need for a time-consuming tape-winding operation regardless of whether or not the wire bundle includes the wires of different outer diameters, and the production process can be suitably automated, and the improved productivity and the enhanced waterproof performance can be achieved.

Preferably, the water stop agent has a low viscosity. In this case, as compared with the case where there is used a water stop agent of relatively high viscosity, the water stop agent, coated on the wire group in the water stop agent-coating step, can easily permeate into the gap between any two adjacent wires during the shaking operation in the water stop agent-penetrating step, and therefore there can be obtained the good condition in which the water stop agent sufficiently permeates into the gap between any two adjacent wires in a short time. Therefore, the lowered reliability of the waterproof performance due to variations in the penetration of the water stop agent can be prevented, and besides the time, required for the water stop agent-penetrating step, can be shortened.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

A preferred embodiment of method of waterproofing a wire harness according to the present invention will now be described below in detail with reference to FIGS. 1 to 5B.

Figure 1:
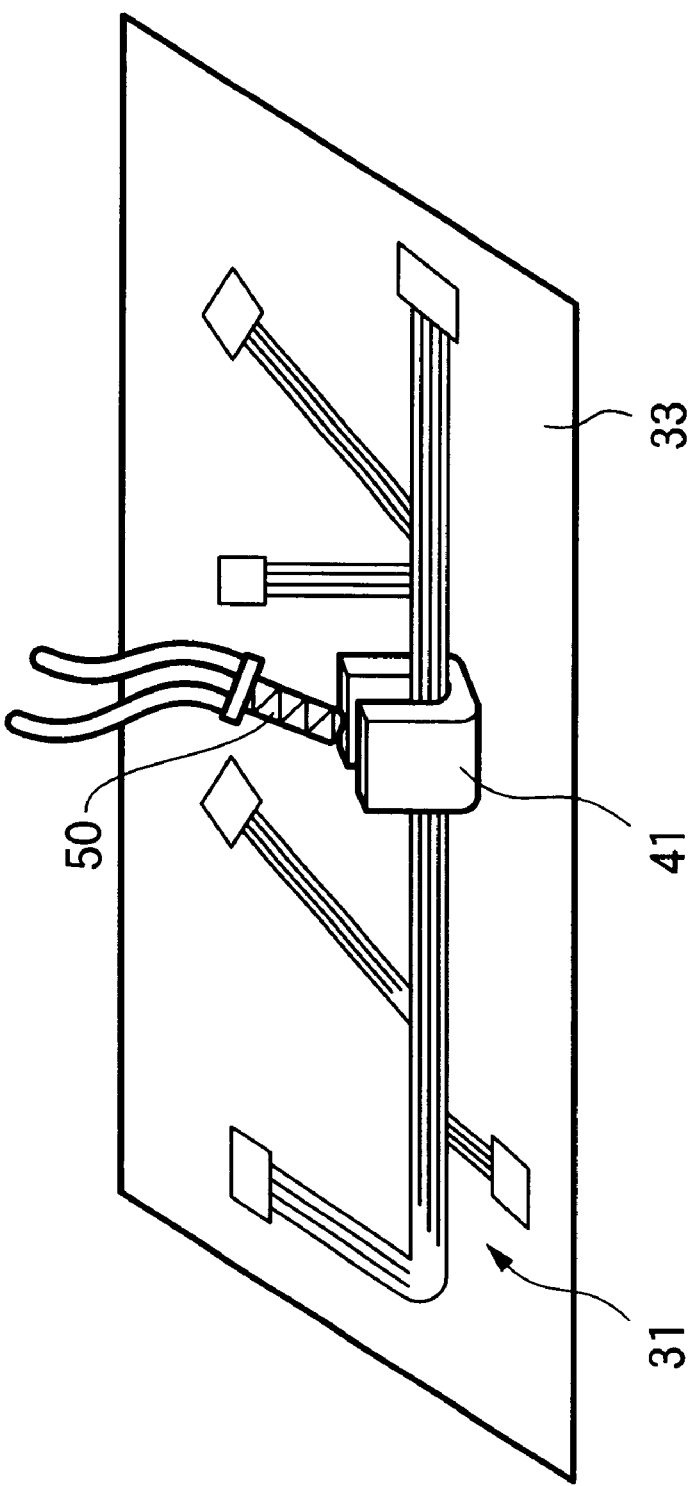
FIG. 1 is a perspective view showing the construction of an apparatus for performing one preferred embodiment of a wire harness-waterproofing method according to the present invention.

A waterproof wire harness 31, produced by the waterproofing method of this embodiment, is used in the electric wiring for an automobile. When a group of wires, constituting a wire harness, are shaped in a branched manner into an arrangement form, corresponding to an arrangement form on the vehicle, on an arrangement plate 33 as shown in FIG. 1, those portions of the wires for passing through a grommet, adapted to be mounted in a through hole in a vehicle body panel of the automobile, are tied into a waterproofed wire bundle.

A lower mold 41 and an upper mold 43 corresponding to this lower mold 41 are provided on that portion of the arrangement plate 33 corresponding to the grommet-passing portion of the wire group. The lower mold 41 and upper mold 43 are formed as the waterproofing jig.

The lower mold 41 has a waterproofing groove 44 on which the grommet-passing portion of the wire group 35 is provided. The waterproofing groove 44 is a deep U-shaped groove shown in cross-section. A bottom portion 44a of the waterproofing groove 44 is formed into a semi-circular shown in cross-section corresponding to the contour of a lower portion of a cross-sectionally circular harness-passing hole in the grommet.

Figure 4B:
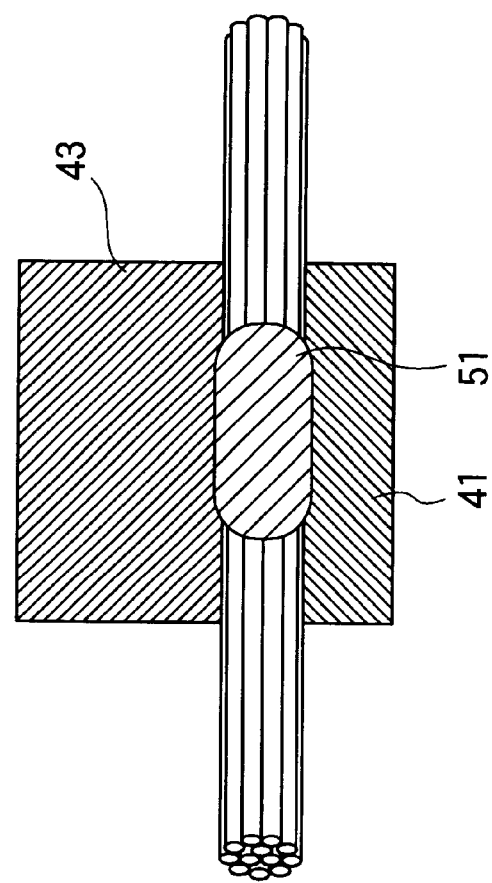
FIG. 4B is a cross-sectional view taken along the line IV—IV of FIG. 4A.
Figure 4A:
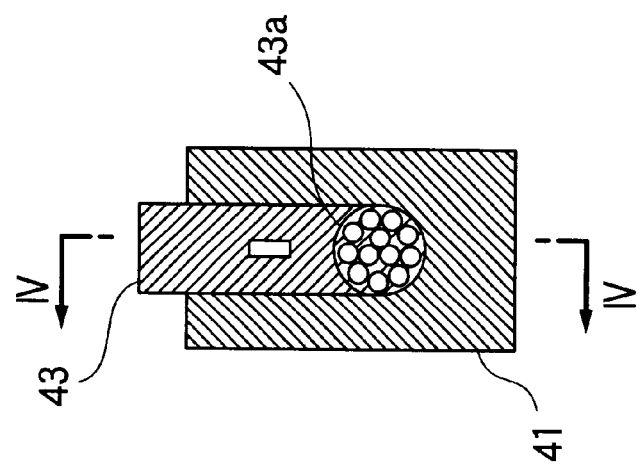
FIG. 4A is a transverse cross-sectional view of the waterproofing jig, showing a shaping step of the wire harness-waterproofing method according to the invention.
Figure 5B:
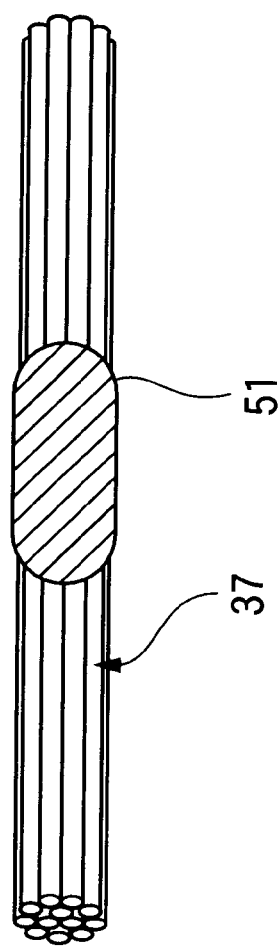
FIG. 5B is a view as seen from a direction of arrow V of FIG. 5A.
Figure 5A:
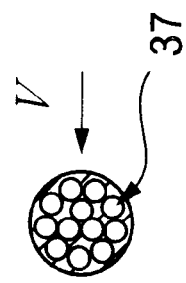
FIG. 5A is a cross-sectional view of a grommet-passing portion of a wire bundle formed by the wire harness-waterproofing method according to the invention.
Figure 6A:
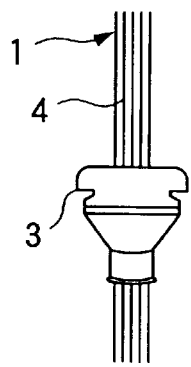
FIGS. 6A to 6C are a view explanatory of the procedure of applying a waterproofing to a grommet-passing portion in a related waterproof wire harness-producing method.
Figure 6B:
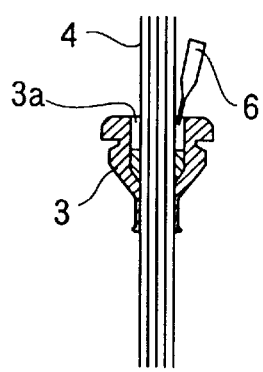
Figure 6C:
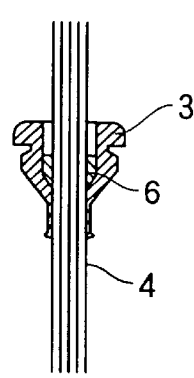
Figure 7:
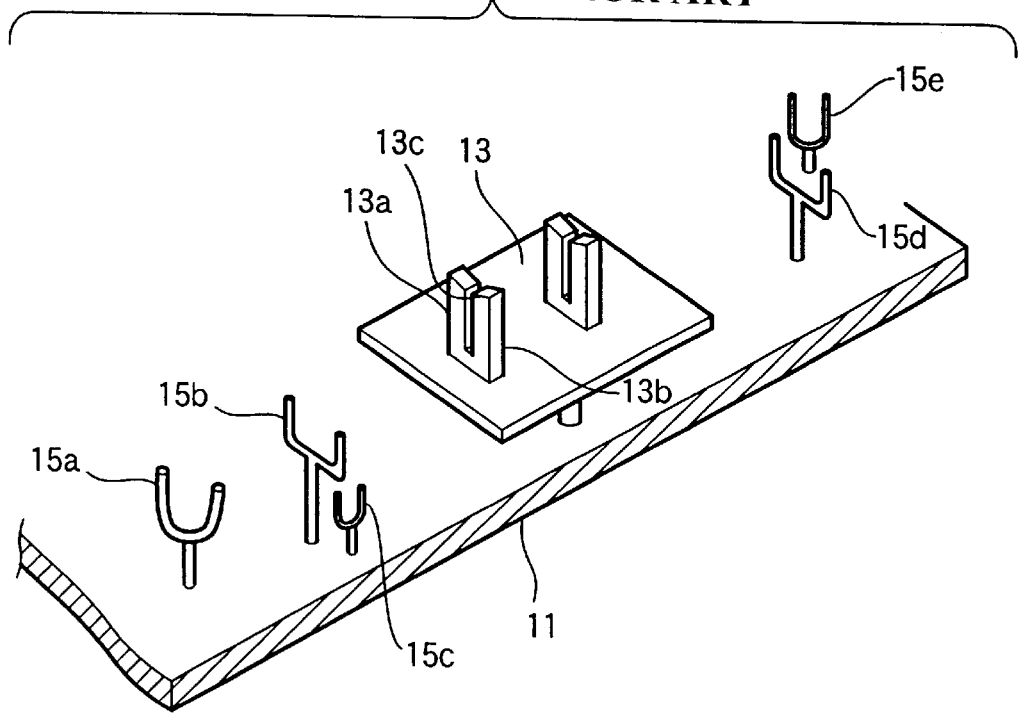
FIG. 7 is a perspective view showing the construction of a waterproofing jig used in another related waterproof wire harness-producing method.
Figure 8A:
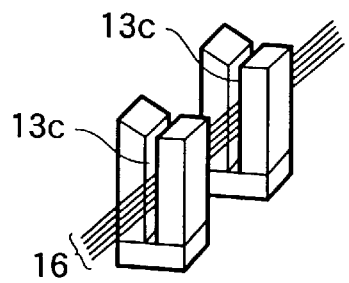
FIGS. 8A to 8F are a view explanatory of the procedure of applying a waterproofing to a grommet-passing portion in the related waterproof wire harness-producing method by the use of the waterproofing jig of FIG. 7.
Figure 8B:
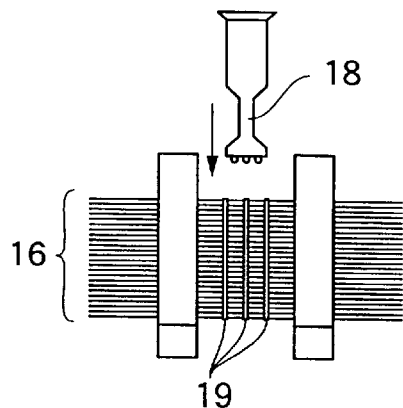
Figure 8C:
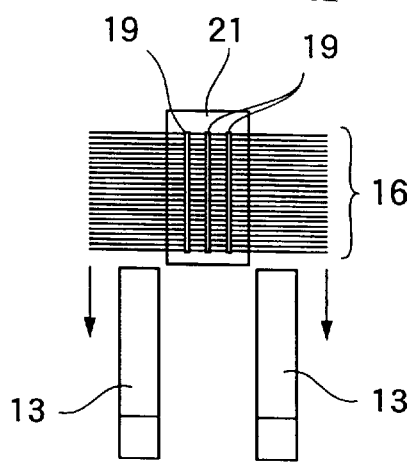
Figure 8D:
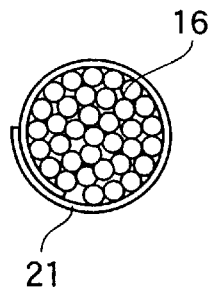
Figure 8E:
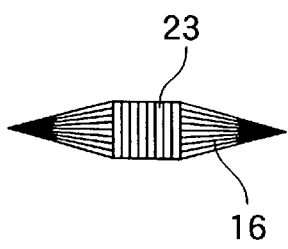
Figure 8F:
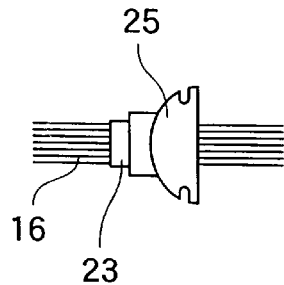

As shown in FIG. 4, the upper mold 43 is formed so as to fit with the waterproofing groove 44. A tip end face of the upper mold 43 is formed into a molding face 43a for pressing the wire group 35. When the upper mold 43 is fitted with the lower mold 41, the molding face 43a is abutted against the wire group 35 which is provided on the bottom portion 44a of the waterproofing groove 44. This molding face 43a and the bottom portion 44a of the waterproofing groove 44 form a circular molding space shown in cross-section corresponding to the circular cross-section of the harness-passing hole in the grommet when the upper mold 43 is fitted with the waterproofing groove 44 of the lower mold 41.

In this embodiment, the upper mold 43 and the lower mold 41 are made of a fluororesin (fluorine plastics) from which a water stop agent coated on the wires can be easily released.

Next, the procedure of the waterproofing method according to this embodiment will be described bellow in detail with reference to the drawings.

Figure 2B:
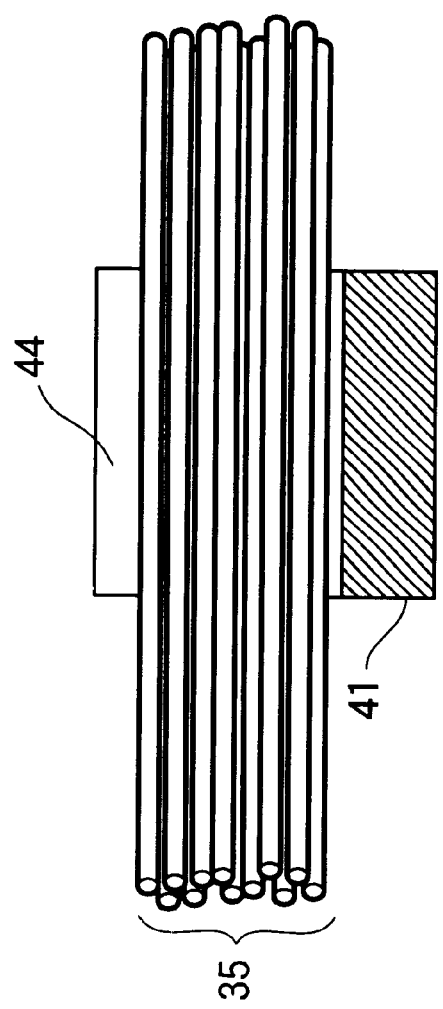
FIG. 2B is a cross-sectional view taken along the line II—II of FIG. 2A.
Figure 2A:
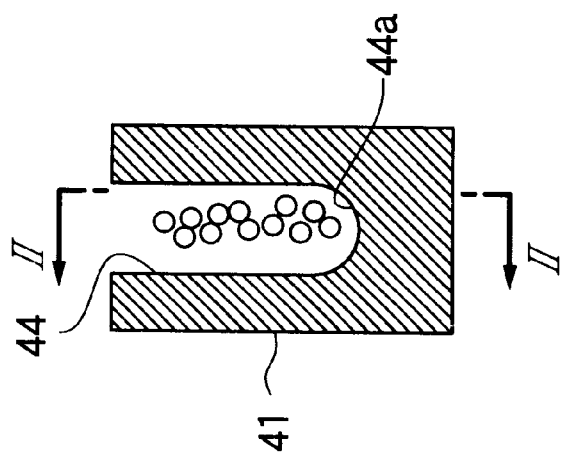
FIG. 2A is a transverse cross-sectional view of a waterproofing jig, showing a wire group mounting-step of the wire harness-waterproofing method according to the invention.

First, as shown in FIGS. 2A and 2B, that portion of the wire group 35 for passing through the grommet is provided on the waterproofing groove 44 in the wire group-mounting step.

Figure 3B:
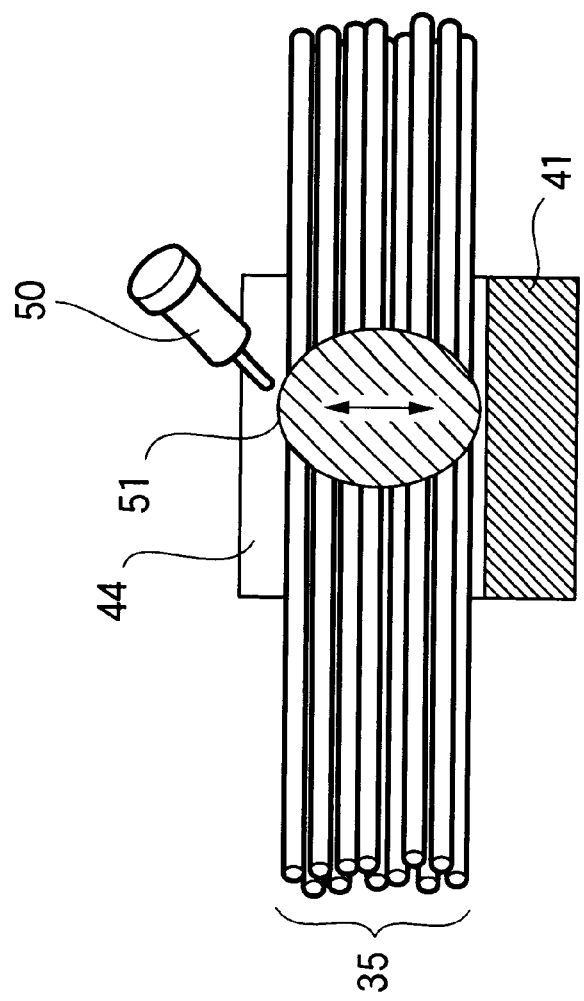
FIG. 3B is a cross-sectional view taken along the line III—III of FIG. 3A.
Figure 3A:
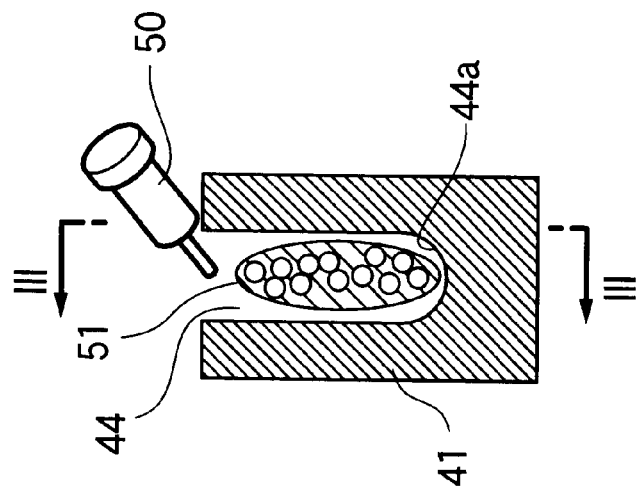
FIG. 3A is a transverse cross-sectional view of the waterproofing jig, showing a water stop agent-coating step and a water stop agent-penetrating step of the wire harness-waterproofing method according to the invention.

Then, as shown in FIGS. 3A and 3B, the water stop agent 51 of low viscosity is coated onto that portion of the wire group 35, provided on the waterproofing groove 44, by a water stop agent-coating nozzle 50 in the water stop agent-coating step.

Further, the wire group 35 is placed on the waterproofing groove 44 and coated with the water stop agent 51. The wire group 35 is vibrated upward and downward so as to permeate the water stop agent 51 into a region over an entire periphery of each of the wires and also into a gap between any two adjacent wires in the water stop agent-penetrating step.

In this embodiment, two-pack foamed silicone(RTV), such as "Toray Dow Caulking Silicone SE1900" (tradename) is used as the water stop agent 51. It takes only a short time of 5 to 10 minutes for this water stop agent 51 to be cured while it takes about 48 hours for commonly-used moisture-curing silicone (RTV) to be cured, and therefore the time, required for the operation, can be greatly reduced.

After the water stop agent-penetrating step is finished, as shown in FIG. 4, the wire group 35, having the interstices filled up by the water stop agent 51, is pressed by the upper mold 43 fitted with the waterproofing groove 44, and formed into a shape, corresponding to the cross-sectional shape of the harness-passing hole in the grommet, and the water stop agent 51 is solidified in the shaping step.

After the curing of the water stop agent 51 is finished, the lower mold 41 and the upper mold 43 are spaced apart from each other. A wire bundle 37, tied by the water stop agent 51, is removed from the molds, thus completing the operation.

In the above waterproof wire harness-producing method of the present invention, the grommet-passing portion of the wire group 35, having the water stop agent 51 coated on the outer peripheral face of each of the wires forming the wire group 35, is pressed and formed into the shape, corresponding to the cross-sectional shape of the harness-passing hole in the grommet, by the waterproofing groove 44 in the lower mold 41 and the upper mold 43 fitted in the waterproofing groove 44, so that the interstices between the wires are filled up by the water stop agent 51, and at the same time by the press-shaping operation, effected by the upper and lower molds, the wire group is finished into the wire bundle of high precision which has such an outer diameter as to snugly fit in the harness-passing hole in the grommet.

Therefore, the grommet-passing portion of the wire group 35 can be easily tied into the waterproof structure in which the interstices between the wires are filled up by the water stop agent 51, and besides the tied wire bundle can be highly precisely finished into the desired outer diameter without the need for a time-consuming tape-winding operation regardless of whether or not the wire bundle includes the wires of different outer diameters, and the production process can be suitably automated, and the improved productivity and the enhanced waterproof performance can be achieved.

In this embodiment, the water stop agent 51 of low viscosity is used, and therefore as compared with the case where a water stop agent of relatively high viscosity is used as the water stop agent 51, the water stop agent 51, coated on the wire group 35 in the water stop agent-coating step, can easily permeate into the gap between any two adjacent wires during the shaking operation in the water stop agent-penetrating step, and therefore there can be obtained the good condition in which the water stop agent sufficiently permeates into the gap between any two adjacent wires in a short time. Therefore, the lowered reliability of the waterproof performance due to variations in the penetration of the water stop agent 51 can be prevented, and besides the time, required for the water stop agent-penetrating step, can be shortened.

In this embodiment, the shaping of the grommet-passing portion of the wire bundle is effected by the press-shaping operation employing the lower mold 41 and the upper mold 43, and the shaping operation can be completed within a much shorter time as compared with the case where the shaping operation is effected by the tape-winding operation.

Therefore, as compared with the related method including the time-consuming tape-winding operation, two-pack foamed silicone RTV, which can be completely cured in a short time, can be used as the water stop agent, and with the use of such short-time-curing water stop agent, the productivity can be further improved greatly.

In this embodiment, the wire bundle is shaped into the circular cross-sectional shape by the lower and upper molds 41 and 43 on the assumption that the harness-passing hole in the grommet has the circular cross-sectional shape. However, in the case of shaping the wire bundle by such molds, the wire bundle can be formed into a desired shape (e.g. a square shape) other than the circular cross-sectional shape by suitably forming molding faces of the molds, and a grommet, having a harness-passing hole of a shape other than a circular shape, can be selected, and by doing so, the degree of freedom of arrangement of the wire harness can be increased.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A method of waterproofing a plurality of wires which constitute a wire harness passed through a through hole formed in a grommet, comprising the steps of:

providing a lower mold having a first recessed portion, and an upper mold having a second recessed portion, the first recessed portion and the second recessed portion defining a cavity when the upper mold and the lower mold are integrated, such that a cross section of the cavity is substantially identical with a cross section of the through hole formed in the grommet; thereafter placing the wires on the first recessed portion of the lower mold; thereafter coating the wires with water stop agent; therafter applying vibration to the wires so as to permeate the water stop agent into a gap between the wires; thereafter integrating the upper mold and the lower mold such that a cross section of the wire harness is matched with a cross section of the cavity; and thereafter solidifying the water stop agent permeated into the wires.

2. A method of waterproofing a wire harness as set forth in claim 1, wherein the water stop agent has a low viscosity.

3. A method of waterproofing a wire harness as set forth in claim 1, wherein the cross section of the cavity is shaped into a circle.

4. A method of waterproofing a wire harness as set forth in claim 1, wherein a cross section of the first recessed portion of the lower mold is identical with a part of an inner peripheral face of the through hole formed in a grommet.

5. The method of claim 1, wherein said providing step includes the step of providing the first recessed portion with a deep U-shaped groove including a curved bottom portion and an upper portion defined by opposing straight wall portions and wherein said integrating step includes the step of inserting said upper mold into the upper portion of the U-shaped groove of the lower mold.

6. The method of claim 5, wherein said during said coating step at least some of said wires are located in said upper portion of said U-shaped groove.

7. The method of claim 6, wherein said integrating step includes the step of pushing said at least some of said wires into the lower portion of said U-shape groove.

* * * * *